(12) United States Patent
Andon et al.

(10) Patent No.: US 11,910,871 B2
(45) Date of Patent: Feb. 27, 2024

(54) FOOTWEAR DESIGNING TOOL

(71) Applicant: NIKE, Inc., Beaverton, OR (US)

(72) Inventors: Christopher L. Andon, Portland, OR (US); Brad N. Clarkson, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 267 days.

(21) Appl. No.: 17/223,734

(22) Filed: Apr. 6, 2021

(65) Prior Publication Data
US 2021/0219660 A1 Jul. 22, 2021

Related U.S. Application Data

(63) Continuation of application No. 16/001,080, filed on Jun. 6, 2018, now Pat. No. 10,993,502, which is a
(Continued)

(51) Int. Cl.
*G06Q 30/06* (2023.01)
*A43B 23/02* (2006.01)
(Continued)

(52) U.S. Cl.
CPC ........ *A43B 23/0205* (2013.01); *A43B 1/0027* (2013.01); *A43B 1/04* (2013.01);
(Continued)

(58) Field of Classification Search
CPC ..... A43B 23/0205; A43B 1/0027; A43B 1/04; A43B 7/08; D04B 37/02; A43D 2200/60;
(Continued)

(56) References Cited

U.S. PATENT DOCUMENTS 2,879,652 A * 3/1959 Saunders ............... D04B 15/14
66/14
6,601,042 B1 7/2003 Lyden
(Continued)

FOREIGN PATENT DOCUMENTS

CN 102177525 A 9/2011
CN 103038771 A 4/2013
(Continued)

OTHER PUBLICATIONS

Mar. 16, 2018 (EP) ESR—App. No. 15811488.4.

*Primary Examiner* — Kandasamy Thangavelu
(74) *Attorney, Agent, or Firm* — Banner & Witcoff, Ltd.

(57) ABSTRACT

Computer based systems and methods for designing (e.g., customization) of consumer products, articles of footwear, knit footwear uppers, and the like. In some embodiments, a user may generate and/or modify footwear designs using a footwear design interface. Additionally or alternatively, the footwear design interface may be configured to simulate the layout and/or operation of a knitting machine to provide the user with the impression of physically designing and/or manufacturing an article of footwear. In other embodiments, the system may disallow prospective footwear design changes based on limitations associated with inventory availability and the footwear design characteristics.

20 Claims, 6 Drawing Sheets

Related U.S. Application Data continuation of application No. 14/747,517, filed on Jun. 23, 2015, now Pat. No. 10,021,939.

(60) Provisional application No. 62/015,698, filed on Jun. 23, 2014.

(51) Int. Cl.

| | | |
|---|---|---|
| *D04B 37/02* | (2006.01) | |
| *A43B 1/00* | (2006.01) | |
| *A43B 1/04* | (2022.01) | |
| *A43B 7/08* | (2022.01) | |
| *G06F 30/00* | (2020.01) | |
| *G06F 30/20* | (2020.01) | |
| *G06F 113/12* | (2020.01) | |

(52) U.S. Cl.
CPC ............ *A43B 7/08* (2013.01); *D04B 37/02* (2013.01); *A43D 2200/60* (2013.01); *D10B 2501/043* (2013.01); *G06F 30/00* (2020.01); *G06F 30/20* (2020.01); *G06F 2113/12* (2020.01); *G06Q 30/06* (2013.01)

(58) Field of Classification Search
CPC ... D10B 2501/043; G06F 30/00; G06F 30/20; G06F 2113/12; G06Q 30/06
See application file for complete search history.

(56) References Cited

U.S. PATENT DOCUMENTS

| | | |
|---|---|---|
| 8,065,821 B1 | 11/2011 | Reid |
| 8,209,883 B2 | 7/2012 | Lyden |
| 2003/0033730 A1 | 2/2003 | Burke et al. |
| 2005/0252043 A1 | 11/2005 | Blackwell |
| 2006/0288614 A1 | 12/2006 | Tonkel |
| 2007/0100592 A1 | 5/2007 | Lish et al. |
| 2009/0073162 A1 | 3/2009 | Waatti et al. |
| 2009/0222127 A1 | 9/2009 | Lind |
| 2010/0235258 A1 | 9/2010 | Langvin |
| 2010/0289971 A1 | 11/2010 | Odland et al. |
| 2010/0299616 A1 | 11/2010 | Chen et al. |
| 2010/0318442 A1 | 12/2010 | Paul et al. |
| 2011/0004524 A1 | 1/2011 | Paul et al. |
| 2011/0232008 A1 | 9/2011 | Crisp |
| 2011/0271418 A1 | 11/2011 | Crockett-Grabus |
| 2012/0089477 A1 | 4/2012 | Dean et al. |
| 2012/0255201 A1 * | 10/2012 | Little .................. A43D 111/00 12/142 R |
| 2013/0155111 A1 | 6/2013 | Dirsa et al. |
| 2013/0192086 A1 | 8/2013 | Tawney et al. |
| 2014/0012406 A1 | 1/2014 | Cioffi et al. |
| 2014/0137434 A1 | 5/2014 | Craig |
| 2014/0150292 A1 | 6/2014 | Podhajny et al. |
| 2015/0366293 A1 | 12/2015 | Clarkson |
| 2019/0116936 A1 | 4/2019 | Aceves Tinajero et al. |
| 2019/0368085 A1 | 12/2019 | Morgan et al. |

FOREIGN PATENT DOCUMENTS

| | | | |
|---|---|---|---|
| CN | 103653542 A | * | 3/2014 |
| EP | 0640707 A1 | | 3/1995 |
| JP | 2002041907 A | | 2/2002 |
| JP | 2012504068 A | | 2/2012 |
| JP | 2013220357 A | | 10/2013 |
| JP | 2014112404 A | | 6/2014 |
| KR | 20120018380 A | | 3/2012 |
| WO | 20090073162 A2 | | 6/2009 |
| WO | WO2009149886 A1 * | 12/2009 | ............... A43B 7/08 |
| WO | 2012166244 A1 | | 12/2012 |

* cited by examiner

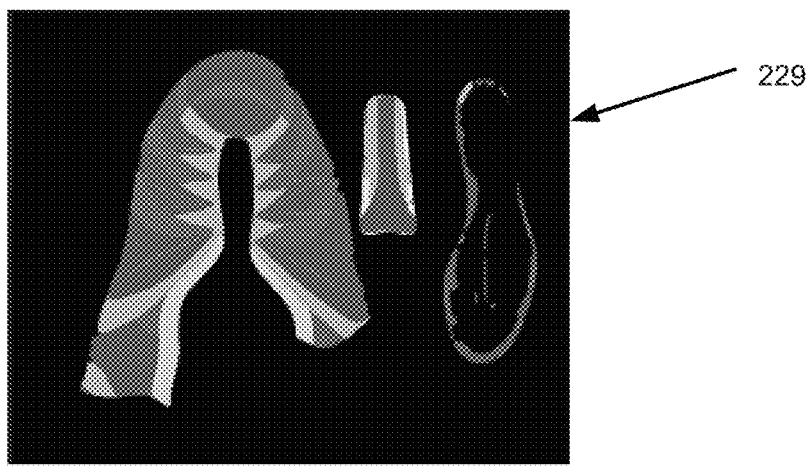
FIG. 2B
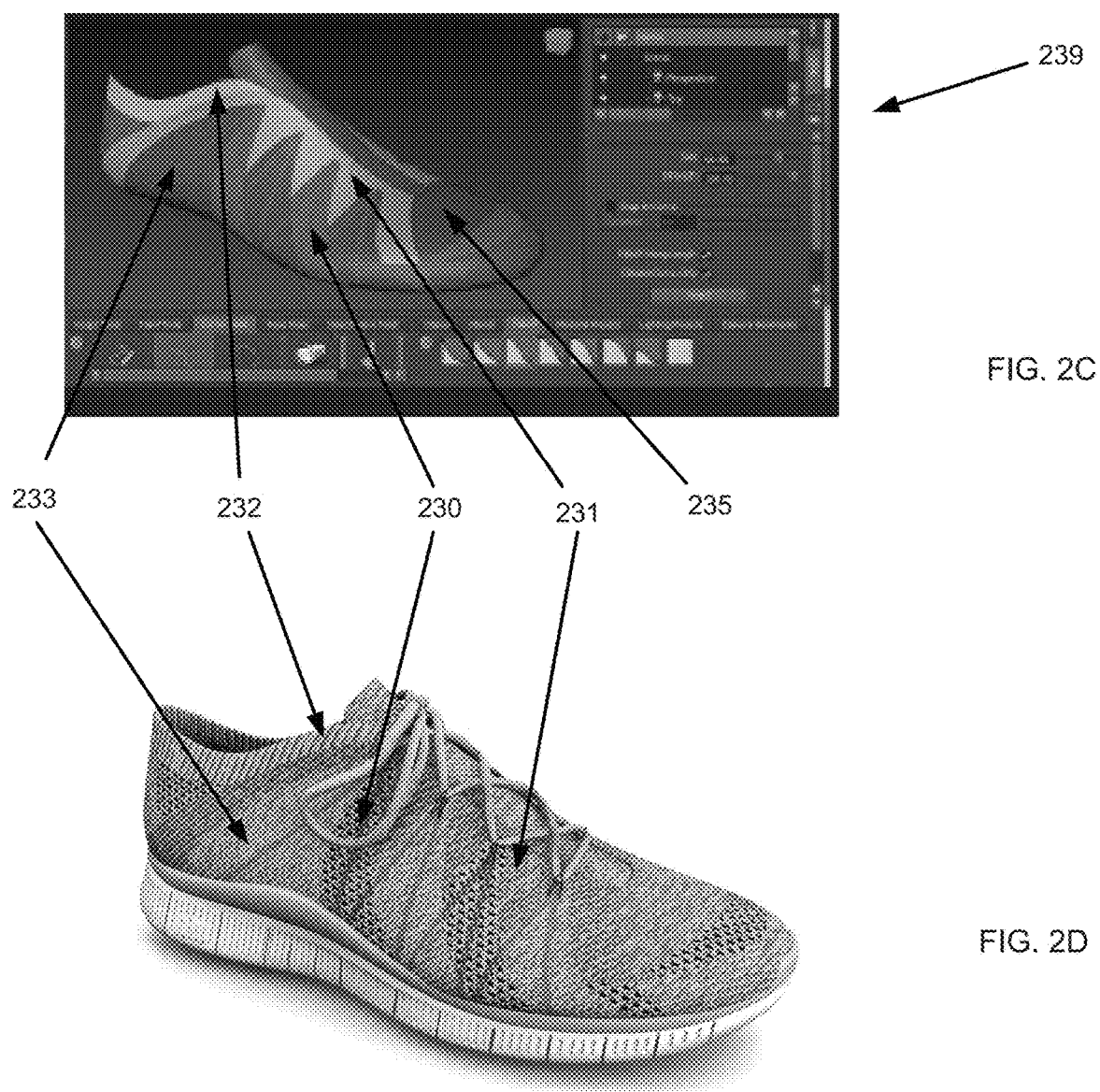
FIG. 2C
FIG. 2D

FOOTWEAR DESIGNING TOOL

CROSS-REFERENCE TO RELATED APPLICATIONS

This application is a continuation of U.S. patent application Ser. No. 16/001,080 filed Jun. 6, 2018, which is a continuation of U.S. patent application Ser. No. 14/747,517 filed Jun. 23, 2015, now U.S. Pat. No. 10,021,939 issued Jul. 17, 2018, which claims the benefit of and priority to U.S. Provisional Patent Application No. 62/015,698, entitled "FOOTWEAR DESIGNING TOOL," filed Jun. 23, 2014, which are expressly incorporated herein by reference in their entireties for any and all non-limiting purposes.

FIELD OF THE INVENTION

The technologies disclosed relate to systems and methods used to design footwear. More particularly, the technologies disclosed relate to methods and systems for designing footwear, including footwear uppers.

BACKGROUND OF THE INVENTION

Conventional articles of athletic footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces and absorbing energy (i.e., imparting cushioning), the sole structure may provide traction and control potentially harmful foot motion, such as over pronation. Accordingly, the upper and the sole structure operate cooperatively to provide a comfortable structure that is suited for a wide variety of ambulatory activities, such as walking and running.

The upper forms a void on the interior of the footwear for receiving the foot. The void has the general shape of the foot, and access to the void is provided by an ankle opening. Accordingly, the upper extends over the instep and toe areas of the foot, along the medial and lateral sides of the foot, and around the heel area of the foot. A lacing system is often incorporated into the upper to selectively increase the size of the ankle opening and permit the wearer to modify certain dimensions of the upper, particularly girth, to accommodate feet with varying proportions. In addition, the upper may include a tongue that extends under the lacing system to enhance the comfort of the footwear, and the upper may include a heel counter to limit movement of the heel.

Various materials may be utilized in manufacturing the upper. Some uppers are formed of knit material, such as thread and/or yarn. Knit uppers have appearances that differ from the appearances of uppers formed of other materials like leather, synthetic leather, and rubber. During the design and manufacturing of a knit upper it is common for a designer to create a design and then for one or more other people to program a knitting machine to manufacture the upper. The separation of parts of the design and manufacturing process can result in the development and manufacturing of several uppers before the designer approves a design that can be manufactured by a knitting machine. Multiple rounds or cycles of creating many knit uppers that don't meet a designer's view of the design imagined can be costly in time and resources.

Therefore, there is a need in the art for systems and methods that can allow designers, during the design process, the ability to electronically visualize knit uppers that more realistically embody a manufactured knit upper, so as to allow for timely adjusting designs prior to manufacturing. Such functionality can drastically improve the design to manufacturing process in knit engineering.

SUMMARY OF THE INVENTION

One or more of the above-mentioned needs in the art are satisfied by the disclosed systems and methods for designing footwear, including footwear uppers.

In certain aspects of this disclosure, the present technologies disclosed can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present technologies disclosed are set forth in the accompanying drawings and the description below. Other features and advantages of the technologies disclosed will be apparent from the description and drawings, and from the claims.

BRIEF DESCRIPTION OF THE DRAWINGS

The present technologies disclosed are illustrated by way of example and not limited in the accompanying figures in which like reference numerals indicate similar elements and in which:

FIG. 2B illustrates a rendering of a footwear design in accordance with one or more aspects of the present disclosure.

FIG. 2C illustrates an example interface for designing footwear, in accordance with one or more aspects of the present disclosure.

FIG. 2D-2E illustrate a rendering of a footwear design in accordance with one or more aspects of the present disclosure.

DETAILED DESCRIPTION OF THE INVENTION

Figure 1:
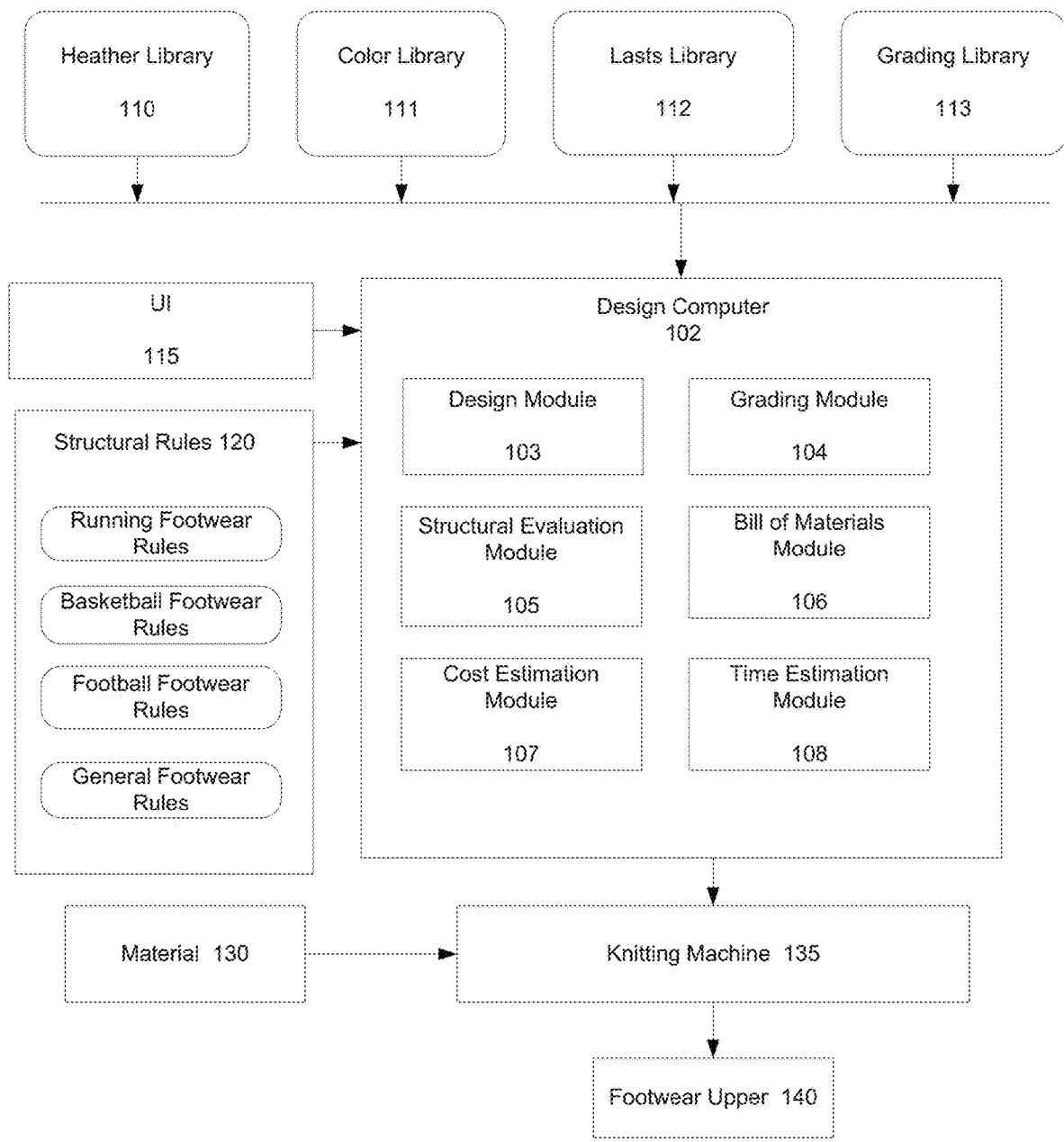
FIG. 1 illustrates a system for designing footwear, in accordance with one or more aspects of the present disclosure.

In general, as described above, some aspects of the present disclosure relate to systems and methods for designing consumer products, such as articles of footwear.

Any desired type of footwear design data may be controlled, altered, or customized by a user of systems and methods according to aspects of the present disclosure, such as: a color of a portion of the article of footwear (e.g., the various upper portions or elements). If desired, systems and methods according to at least some examples of the present disclosure further may allow a user to select from a variety of materials or other characteristics for various portions of the article of footwear, such as different upper material(s); upper thickness(es); upper stiffness characteristics; arch support characteristics; impact-attenuation characteristics; size, orientation, and/or location of openings or windows in the upper; patterns of openings provided in the uppers; laser cutting designs and/or characteristics; laser etching designs and/or characteristics; etc.

While described above in conjunction with design of articles of footwear, aspects of the present disclosure also may be used for design of other consumer products, such as articles of apparel, etc.

In the footwear example, a user may be permitted to select various features of the footwear and manipulate the visual image of the footwear from a software application that is displayed on the user interface or display screen. The user interface may display one or more tools for changing aspects of or otherwise manipulating various design data of the footwear, as described herein.

Users may use computing devices to access the design application and/or website. The computing devices establish a communication channel within a network and communicate with a messaging server system (comprising one or more server computers) that provide interactive design features used to change the design of a product. As will be disclosed in more detail below, any desired communication link and communication protocol may be used to provide and control the data exchange between computing devices and the system. Users may use a computing device to connect to the online design system via a network, such as the Internet, a local area network (LAN), a wide area network (WAN), or the like. Users may connect their computing devices to the system via any communication channel, such as website portals and applications from various internal and/or external sites that link to the portal of the manufacturer.

Any desired types of computing devices may be used without departing from the present disclosure, such as any computing device capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of the present disclosure include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of the present disclosure may include one or more input devices and a data processing system (e.g., including one or more microprocessors). Examples of input devices that may be included with the computing devices include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to aspects of the present disclosure, including display devices integrated with the computing device itself or display devices separate from the computing devices but in communication therewith, such as projector displays, separate monitor displays.

FIG. 1 illustrates a system for designing and manufacturing footwear uppers. A computing device, such as design computer 102 may be programmed with software modules that perform various functions when executed by at least one processor. Software includes computer-executable instructions that may be stored on at least one tangible non-transitory computer-readable medium, such as a solid state or magnetic memory.

The design computer 102 may be connected to a network (not shown) in any desired manner without departing from aspects of the present disclosure, including in conventional manners that are known and used in the art, such as any conventional wired or wireless connection and using any network connection protocol. Systems and methods in accordance with examples of the present disclosure also will provide a user interface display on the user's computing device. This interface will allow the user to see the subject matter of the design effort and will allow the user to introduce his/her input to the design effort. The user interfaces on various devices will be provided and controlled by the user's computing device and/or by the server system, and data for generating, maintaining, and receiving input through the user interfaces will be generated and provided via computer readable media included as part of or associated with the computing device and/or the server system. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

A color library 111 may contain various color values. Individual color values may be arranged in a database, such as a FileMaker Pro database. In one embodiment, the color values have four channels such as CMYK color values. In another embodiment, the color values have three channels such as RGB color values. The individual color values may correspond to the colors of various materials (e.g., yarn) that are in supply or available to the manufacturer of the footwear upper. As another example, heather library 110 may be connected to design computer 102 via the Internet. The heather library may contain various heather patterns that may be created by one or more knitting machines available to the manufacturer of the footwear upper. A lasts library 112 may contain lasts of various shapes and forms. The last library may also store data files corresponding to base footwear designs. A grading library 113 may contain a collection of previously graded uppers. The collection may identify features of the footwear, such as locations of structures and other attributes along with modifications that were made to grade a base design for use with a range of shoes sizes.

As will be described in more detail with respect to FIG. 2, design websites, interfaces, and/or applications as described herein may display various patterns or models available for custom design, e.g., in one portion of an interface display. These various different models of the product (footwear) may include template or "base" models that are available for a user to select as part of the design process. Such "base" models or templates may be added to or changed based on the user's selections during the design process.

Some of the components shown in FIG. 1 may communicate data to and from design computer 102 during a design session. For example, UI 115 may establish a communication channel with design computer 102 to provide a user interface for customizing or modifying a footwear design. As another example, structure rules component 120 may provide design computer 102 with data relating to one or more structural rules associated with the physical and/or structural integrity required for a footwear upper to be manufactured and the corresponding base footwear design. As will be discussed in more detail, these structural rules may place certain limitations on a user's ability to modify certain aspects of the footwear design during a design session in order to maintain the structural integrity of the footwear upper when manufactured and for use by a wearer. In some aspects of the present disclosure, the structural rules associated with the physical and/or structural integrity required for a footwear upper may vary based on the type of footwear (e.g., running footwear, basketball footwear, football footwear, etc.).

Design computer 102 may contain various modules, including a design module 103 for processing various design changes made to a footwear design via user interface 115. Design module 103 may also render images of the footwear design in accordance with the processed design changes. Design computer 102 may include a grading module 104 for processing and determining changes that may be applied to a footwear design based on a grading change (e.g., increase or decrease in footwear size). For example, grading module 104 may extract information associated with a base footwear design and compare that information to data stored in grading library 113 to render a new base design for a different footwear grading. In some embodiments, grading module 104 may recommend one or more design changes to a base footwear design in view of processed grading information.

Design computer 102 may include a structural evaluation module 105 for processing data to determine whether design changes made to a footwear design via user interface 115 are acceptable. For example, structural evaluation module 105 may extract information associated with a base footwear design and compare that information with data from structural rules component 120 to determine whether a design change conforms to the predetermined structural rules and/or physical limitations associated with the base footwear design and/or knitting machine used to manufacture the footwear upper. In some aspects of the present disclosure, the evaluation module 105 may operatively communicate with a database (or other suitable form of storage) storing a plurality of predetermined structural integrity characteristics associated with each of base footwear designs available for selection by the user.

Design computer 102 may include a bill of materials module 106 for processing data relating to the availability of the various materials that may be utilized for manufacturing footwear upper 140 in accordance with the footwear design. Design computer 102 may extract information associated with a base footwear design and compare that information with data relating to a current supply or availability of material 130 to determine whether a requested design change is acceptable.

Design computer 102 may also include a cost estimation module 107 for processing data relating to the cost of manufacturing upper 140 based on the footwear design. Design computer 102 may extract information associated with a footwear design and compare that information to data collected by and/or stored in cost estimation module 107 to calculate a cost to manufacture footwear upper 140 based on said footwear design, and to determine whether the cost exceeds any predefined cost thresholds. The cost estimation module 107 may recommend one or more design changes to the footwear design to reduce the estimated cost below the predefined cost threshold.

Design computer 102 may also include a time estimation module 108 for processing data relating to the amount of time needed to manufacture upper 140 based on the footwear design. Design computer 102 may extract information associated with a footwear design and compare that information to data collected by and/or stored in time estimation module 108 to calculate an amount of time required to manufacture footwear upper 140 based on the footwear design, and to determine whether the time exceeds any predefined time thresholds. The time estimation module 108 may recommend one or more design changes to the footwear design to reduce the estimated manufacturing time below the predefined time threshold. In some aspects of the present disclosure, an interface or sub-interface may be displayed to a user during a design session depicting the amount of time required to manufacture the footwear upper in view of the current footwear design. As the user modifies the footwear design, the interface (or sub-interface) may be updated to reflect an updated amount of time required to manufacture the footwear upper.

Design computer 102 may also include a variety of interface units and drives for reading and writing data or files. Exemplary interface units and drives include a keyboard, pointing device, microphone, pen device, touchscreen or other input devices.

As discussed above, some of the components shown in FIG. 1 may be connected to each other via a network, such as a local area network (LAN) or a wide area network (WAN). For example, color library 111 may be connected to design computer 102 via the Internet. In another example, design computer 102 may transmit knitting instructions to knitting machine 135 in the form of an encrypted file via the Internet. The system shown in FIG. 1 may include conventional network components (not shown), such as switches, wireless access points and routers to connect the components shown.

Various features of user interfaces generated by a computing device for accepting user input and providing a user with information regarding the design will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with one or more aspects of the present disclosure.

Additional aspects of the present disclosure relate to user interfaces provided on computing devices that allow users to design articles of footwear (or other consumer products). The user interfaces may include elements and features that allow use and/or activation of any of the features and/or functionality described above and/or any of the features and/or functionality described in more detail below.

As some more specific examples, aspects of the present disclosure relate to computer readable media including computer executable instructions stored thereon for generating a user interface for a footwear design session on a computer controlled display device. This user interface may include, for example: (a) a first display portion including at least one rendering of an article of footwear; (b) one or more selector elements (such as a pointer or cursor) that allow a first user to select a portion of the article of footwear; (c) an indicator indicating what portion(s) of the article of footwear has been selected via an individual selector element (such as text, icons, pictures, animations, etc.); and (d) a first element for producing a change in an appearance of the rendering of the article of footwear in the first display portion based on input generated by the first user. The first element (or at least some element of the interface) may include features like a color palette or color menu that allows users to change a color of a selected portion of the article of footwear and/or a component of the article of footwear (e.g., knit material); one or more orientation elements that allow users to change an orientation of the article of footwear as rendered in the first display portion; one way, two way, or multi-way user communication elements or features (such as textual input and display panel(s), instant messaging capabilities, audio and/or video communication capabilities, etc.); etc. The user interface further may include an input portion through which the first user can input data used to set up a collaborative footwear design session with a second user (or another user).

Given this general background and information, more detailed information regarding specific examples of systems, methods, computer-readable media, and user interfaces in accordance with the present disclosure will be described in more detail below. It should be understood that this more detailed description relates to various specific examples of the present disclosure and their features and functionality, and this description should not be construed as limiting the scope of the present disclosure.

Figure 2A:
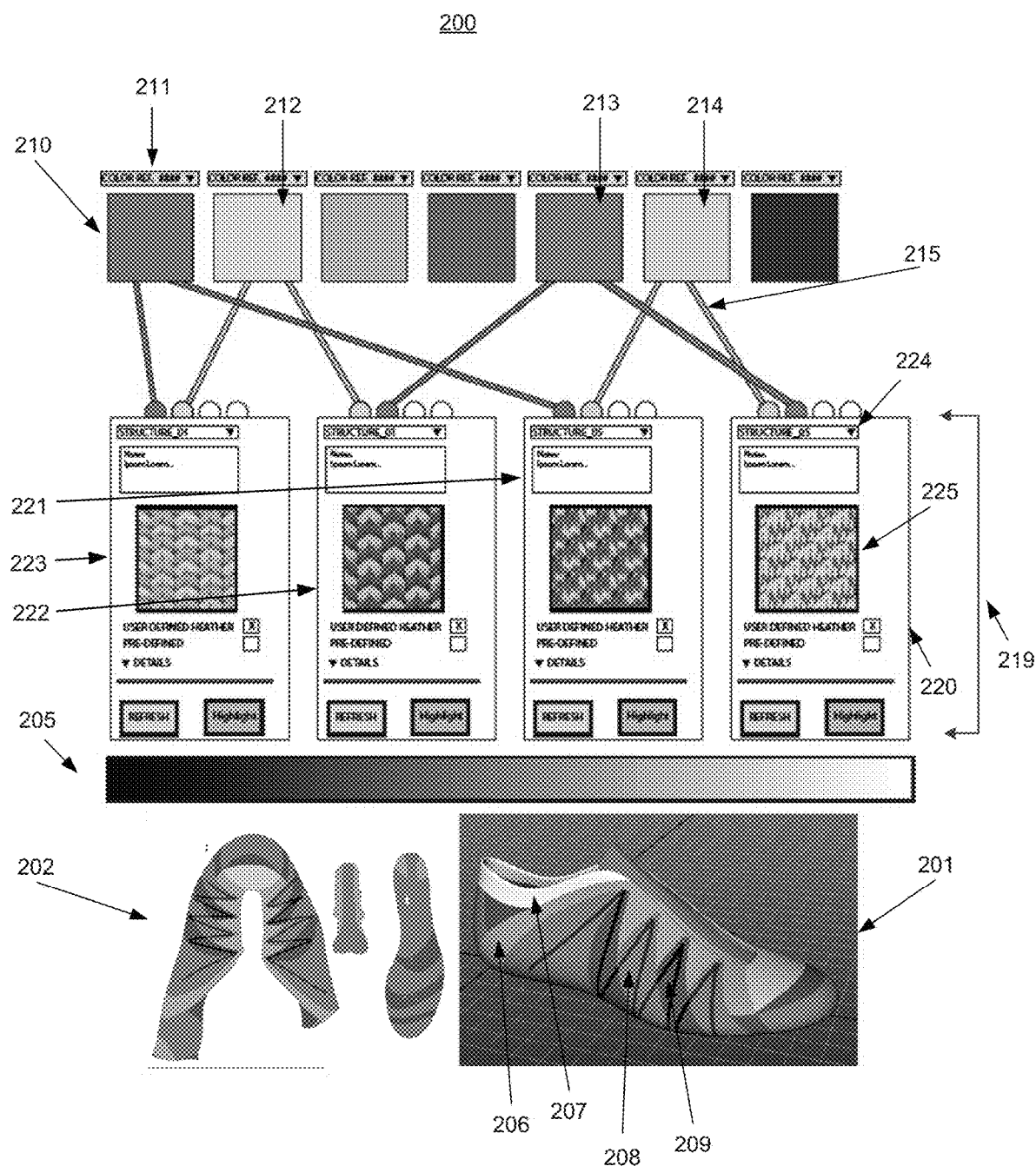
FIG. 2A illustrates an example interface for designing footwear, in accordance with one or more aspects of the present disclosure.

In at least some aspects of the present disclosure, a design session may be launched or initiated from a user's on-line shopping venture. FIG. 2A illustrates an example interface for modifying a footwear design in accordance with one or more aspects of the present disclosure. As noted in more detail below, during the creation of a base footwear design, a user may modify the base footwear design based on a variety of user selections during the design process, including the creation of certain design features. After a base footwear design has been created and/or selected, the user may customize the footwear design based on a variety of user selections, including the selection of knit structures, materials and colors that may be applied to the footwear design.

Initiation of a design session may result in the launch of a customization webpage or website or a customization application program or software, e.g., to create an example user interface screen 200 like that shown in FIG. 2A. Also, initiation of a design session may result in generation of a Customization Session Identification Number (e.g., a unique "Session ID") for the session (e.g., by a server or other computing device that may be in control of the session and the transfer of data relating to the session).

In some aspects of the present disclosure, user interface 200 may be generated by computing device 102. User interface 200 may be configured to have the same functionality as user interface 115. User interface 200 may include various customization features, in any desired arrangement, orientation, or display, without departing from the scope of the present disclosure.

As will be discussed in further detail with reference to FIG. 3, the user interface 200 may correspond to and/or simulate the physical layout and operation of knitting machine 135 so as to provide the user with the impression that they are physically designing and/or manufacturing the footwear upper in accordance with the footwear design. Such a layout is intended to ease the cognitive burden on the user when associating the relationship between the availability and/or supply of material 130, the physical limitations of knitting machine 135 used to manufacture footwear upper 140, and the limitations on design choices in order to maintain the structural integrity of upper 140.

The software for generating the user interface may reside on computer readable media present on or available to the computing device or server system. Alternatively, if desired, the software, or at least some portion(s) thereof, may reside on more than one computing device or server system. The sever system may be operated and maintained by the same organization(s) or individual(s) that operate and maintain the computing device and/or network, or the server system may be operated, controlled, and maintained by a party separate from any or all of these entities. As some more specific examples, the server system may be operated and maintained (and the user interface software also may be operated and maintained) by one or more entities whose products are being marketed through the design systems and methods described below (e.g., a manufacturer, a vendor selected by a manufacturer or retailer, etc.).

In some aspects of the present disclosure, and as will be described in more detail below, the user interface 200 may include a portion in which the product being customized appears (e.g., portions 201, 202), a "color palette" portion for selecting colors for various parts (e.g., portion 210), one or more controllers for changing the appearance or view of the product in portions 201 (such as rotation controls, zoom-in, zoom-out, change in views shown, etc.), an "undo" control (to eliminate the last action or design change), a "redo" control (to re-do a previously erased action or design change), a cost information panel, and a product design information panel. While the product design information may be provided in any desired manner without departing from aspects of the present disclosure, the product design information panel (not shown) may provide information about the various portions of the article of footwear being designed, such as color information, size information, material information, etc.

A user interface, such as user interface 115 or user interface 200, may display various lasts that are available when creating the base footwear design, e.g., in a portion of the interface display, such as display 201. The various lasts may be retrieved from a last library, such as library 112. When a user selects a last, the user interface may provide the user with an option to create a "base" footwear design corresponding to the selected last (e.g., same or similar size, shape, form, etc.). Such base footwear designs may be edited or modified based on user's selections during the design process. For example, the user may draw or paint a variety of features onto the base footwear design to delineate a "styling" of the footwear design. As will be appreciated, the user interface may provide the user with a variety of tools to create and/or modify various features of the base footwear design. A user may store a created and/or modified base footwear design in memory.

If desired, the user may retrieve from memory a predefined base footwear design. For example, base footwear designs may be stored in data files in the memory of design computer 102. These base footwear designs may include footwear designs that were previously created by the user or other users, and that are available for the user to select as the first step of the design process.

The base footwear design serves as the blueprint for a knitting machine, such as knitting machine 135, to manufacture a footwear upper. As will be discussed further below, each base footwear design may include data defining various structural and/or physical limitations of the corresponding footwear upper, such as upper 140, that may limit a user's design choices. Accordingly, while a user may modify or edit a base footwear design during the design process, certain design choices may be restricted during the design process or must be accepted by design computer 102 before the design change will take effect. Such design limitations provide a "real-world" perspective for a user or designer when making design choices that may affect the manufacturing process of the footwear upper.

The user interface provides a realistic basis for delineating limitations in certain design choices due to a variety of factors, including the physical limitations of a knitting machine. For example, a user may be limited to the amount of detail (e.g., point size of a digital paintbrush) that may be used when creating or modifying features of a base footwear design because the user interface may not permit the user to design features that are too small to knit by a knitting machine, or that may be unrealistic given limitations during the manufacturing process (e.g., cost, time, etc). In one embodiment each stitch of a knit pattern cannot be displayed by fewer than one pixel. This "real-world" perspective provided by the user interface may create efficiencies and reduce the amount of work required during the design and manufacturing process of footwear uppers, may result in faster iterations of footwear designs created by a user during the design and manufacturing process, and may enable more accurate samples of footwear designs that are created during the design and manufacturing process.

Other features and functionality may be provided in the user interface, if desired, without departing from the present disclosure. The following features and functionality may be provided in some manner via the interface: the ability to directly return to a previously viewed interface screen, the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product or some other intermediate default design (optionally selected and stored by the user), and the ability to exit or quit the session.

Another feature that may be included in the computer interface is a "last action" capability, which allows users to view the last several steps in the design session (and possibly to see a list of all steps in the design session), more details regarding the individually displayed step (e.g., more specifics about the color, position, size, material or orientation selections, etc.), or the like. The "last action" tool may allow users to select any desired individual step for further action, such as an "undo" action (to undo that step), a "view" change action (e.g., to cause the interface to highlight the change made at that step in the user's views), a reselection action (e.g., to cause the interface to reselect the same part for further action), etc.

Another potential feature that may be included in systems, methods, and computer interfaces in accordance with at least some examples of the present disclosure includes a "cost variations" icon (although other interface elements may be used to activate this functionality). User selection of this interface element may provide users with information and an opportunity to change various features of the designed shoe to either increase or decrease its costs (optionally, with little or no performance change, although any anticipated effect on performance may be displayed for the user to consider). For example, interaction with this interface element may provide the costs associated with a design change made to the base footwear design. As a more specific example, a change in material and/or arrangement of materials for some portion(s) of the upper may make the shoe more comfortable, more stable, and/or otherwise affect its performance characteristics. As another example, the interface may advise the user of the costs associated with adding another design element or feature to the shoe (e.g., changing the knit structure of the upper, adding additional knit material types or colors to the upper, etc.) or changing an existing design element or feature (e.g., changing sizes of various design elements, changing materials, etc.). The cost change associated with eliminating or modifying a design element or feature also may be provided. Systems, methods, and computer interfaces according to one or more aspects of the present disclosure may display a list of various options to the user with the cost differential associated therewith, or in some other manner make this type of cost variation information available to the user.

Referring back to FIG. 2A, in this illustrated example, the user interface 200 includes a display portion 201 in which a 3D view of the footwear design appears, a display portion 202 in which a "lay-flat" 2D view of the footwear design appears, a portion 219 representing the one or more knit structures for the footwear design (e.g., knit structures 221-223), a drop down listing 224 for selecting the knit structure, a portion 225 representing a "material swatch" that displays a texture image representing the knit structure based on the one or more color values selected for the material (e.g., yarn construction) comprising the knit structure, a grayscale 205 indicating where various knit structures correspond to specific "zones" (or areas) on a mapping or rendered image of the base footwear design, a "color picker" or "color palette" portion 210 for selecting colors for the various materials and/or knit structures that may comprise the footwear design.

The user interface may also include one or more drop-down listings 211 for selecting the various color options (or color values) for the color palette, and a color vector 215 indicating which color options have been assigned to one or more knit structures for the footwear design. The color palette 210 may identify the various colors of knit materials selected by the user to be incorporated in the footwear design. For example, as illustrated in FIG. 2, a first portion of color palette 210 corresponding to menu 211 is green thus indicating that a green knit material will be incorporated into the footwear design. Similarly, the respective color for each portion of the color palette may represent the corresponding color of the knit material used for designing and manufacturing the article of footwear (e.g., portion 212 indicates a light-green color has been selected; portion 213 indicates a red color has been selected; portion 214 indicates a yellow color has been selected, etc.).

Changes to various portions of the footwear design may be made in any desired manner without departing from the scope of the present disclosure. For example, a user might first use the pointer to "select" a knit structure associated with some specific zone (or area) of the base footwear design. Once selected, the user can make changes to the knit structure. For example, to change color of the knit structure, first the user may move the pointer over the depiction of the desired part in the display portion (e.g., drop-down listing 211) and "click" a mouse button (or other input device) to "select" that part. This selection action may cause the interface to display a listing of available color options (e.g., color values) that may be applied to a knit structure. Each color option in the listing may also have a specific color name or color reference number. In some aspects of the present invention, the system may limit the number of available colors (and/or other design choices) that may be applied to the footwear design. Additionally or alternatively, this selection action may cause the interface to highlight a corresponding part of the footwear in some manner, such as by enlarging it, coloring it differently, or by bolding the external boundary of it.

When a color option has been selected, the user may associate the color option with a knit structure by drawing a color vector (e.g., color vector 215) from a portion of the color palette (e.g., portion 214) to a knit structure. One or more color vectors may be drawn from a particular portion of the color palette to one or more knit structures in a manner permitted by the base footwear design without departing from the scope of the present disclosure. A user may be limited to a predetermined number of color options that may be associated with a particular knit structure based on rules provided by structural rules component 120, or other components in the system illustrated in FIG. 1. In some aspects of the present disclosure, a particular footwear design may be associated with particular structural rules based on the manufacturing process to create the article of footwear utilizing the footwear design. For example, the structural rules associated with a first footwear design template may be configured to permit a knit structure to include a predetermined number of colors.

Another example feature of systems, methods, and computer interfaces in accordance with at least some examples of the present disclosure relates to a "cost" or "pricing" box. This element of the user interface tracks the cost of the article of footwear in its present design state. As one or more features of the shoe are designed or changed, this may cause the cost of the shoe to change somewhat (e.g., if more expensive materials are used, if a large amount of customization is requested, if additional manufacturing steps or different manufacturing techniques are required, etc.). The interface may maintain a price display so that the user can be aware of which changes to the design have caused a shift in price, and the user may be better able to control the final price of the product.

As noted above, the various color options available to a user in color palette 210 may correspond to the various material 130 (e.g., yarn construction) that are available for manufacturing footwear upper 140. Accordingly, a user may be limited to the number and/or types of color options that may be used for a footwear design and/or associated with a particular knit structure based on data provided by bill of materials module 106, other components illustrated in FIG. 1, or another computing device.

User design choices may also be limited based on the time and/or cost estimated to manufacture the upper in accordance with the corresponding footwear design. After associating one or more color options with a knit structure, the material swatch 225 may display a texture image for the knit structure showing the updated color effects. The user may have the option of rendering an updated 2D view and 3D view of the footwear design during the design session. This may be accomplished by selecting a "render" icon on interface 200 (not shown). Additionally or alternatively, the user interface may automatically update portions 201 and 202 to display the footwear design with updated color effects and other design changes.

As another example, a user may have the option of changing the heather pattern associated with a knit structure. The user may have the option of selecting from one or more pre-defined heathers stored in heather library 110, or the user may design new heather patterns for the knit structure. To change the heather pattern for the knit structure, the user may move the pointer over the depiction of the desired part in the display portion of the structure and "click" a mouse button (or other input device) to "select" the desired heather option. This selection action may cause the interface to display a listing of available pre-defined heather options that may be applied to the corresponding knit structure. A user's ability to create or modify a heather pattern may be limited by the structural and physical limitations of an available knitting machine utilized for manufacturing the article of footwear (or other product).

As yet another example, a user may have the option of adding or modifying knit structures for a footwear design. A user may modify a "zone" of the footwear design associated with a particular knit structure by using the pointer to "select" the knit structure. Once selected, the user may change the position of the knit structure with respect to grayscale 205 by "dragging" the knit structure to a desired position along grayscale 205. As will be discussed in further detail with reference to FIGS. 2B-2D, each color reference along grayscale 205 may indicate where the different knit structures correspond to specific "zones" (or areas) on a rendering or mapping of the base footwear design. After the knit structure is placed in a new position along grayscale 205, display portion 201 and display portion 202 of interface 200 may reflect the change in knit structures and corresponding design properties.

The portions of a user interface representing knit structures (e.g., knit structures 220-223) may be positioned along a grayscale, such as gray scale 205 in user interface 200. As will be appreciated, the grayscale may provide a color reference corresponding to the various zones on an image of the base footwear design. For example, as illustrated in portions 201 and 202, the user interface 200 may depict a rendered image of the base footwear design that includes a grayscale mapping based on the positions of knit structures 220-23 along grayscale 205. As illustrated by elements 230-33, one or more color references on the grayscale (e.g., "darker grey," "dark grey," "grey," "light grey," etc.) may correspond to specific zones on (or portions of) the rendered image of the base footwear design, and as will be explained in more detail below, a knit structure may be associated with one or more particular zones on the base footwear design. Each knit structure assigned to a zone(s) of the base footwear design may have its own unique pattern, heathering, coloring, and other characteristics.

In some aspects of the present disclosure, by positioning a knit structure adjacent to (or in alignment with) a particular color reference on grayscale 205, the zone (or area) of the base footwear design associated with that color reference may adopt the design properties (e.g., color, heather, etc.) of said knit structure. For example, as illustrated in FIG. 2A, the "darker grey" reference of grayscale 205 is located toward the leftmost portion of the grayscale. Additionally, various zones of a footwear design may be illustrated in portions 201 and 202 of user interface 200.

For example, the darker grey reference of grayscale 205 may be associated with a first knit structure and further indicate (or correspond to) a first zone of the footwear design depicted in portion 201. In this example, as depicted by element 209 in FIG. 2A, the first zone of the footwear design is illustrated by the darker grey portions of the footwear design. The first knit structure adjacent to (or in alignment with) the darker grey reference of grayscale 205 may cause the first zone of the footwear design to inherit the features, properties, and/or characteristics of the first knit structure. Similarly, positioning a second knit structure adjacent to (or in alignment with) the darker grey reference of grayscale 205 may cause the first zone of the footwear design to inherit the features, properties, and/or characteristics of the second knit structure.

As another example, the dark grey reference of grayscale 205 may be associated with a knit structure and further indicate (or correspond to) a second zone of the footwear design, as depicted by element 208 in FIG. 2A. Additionally, a grey reference of grayscale 205 may be associated with a knit structure and further indicate a third zone of the footwear design, as depicted by element 206; and a light grey reference of grayscale 205 may be associated with a knit structure and further indicate a fourth zone of the footwear design, as depicted by element 207.

FIGS. 2B-2E illustrate additional example views of 2D and 3D images of a base footwear design that may appear in user interface 200. FIG. 2B illustrates an exemplary rendering of an image showing a "lay-flat" 2D view of the base footwear design. This exemplary 2D view of the base footwear design (e.g., element 229) may be shown in display portion 202 of user interface 200. As will be appreciated, the lay-flat 2D view provides a graphical representation of the knit material corresponding to the base footwear design. FIG. 2C depicts an exemplary interface screen (e.g., interface screen 239) displaying a 3D view of a base footwear design. This exemplary 3D view of the base footwear design may be shown in display portion 201 of user interface 200. In some aspects of the present disclosure, the 3D view of the footwear design may include a color-coded mapping of the various zones of the footwear design.

As noted above, a base footwear design may be represented by various zones that may correspond to different knit structures for the article of footwear to be manufactured. For example, the base footwear design depicted in FIG. 2C includes at least 4 different zones, each having particular design properties and/or characteristics, and being represented by a different color in the user interface to distinguish the various zones. In the example shown in FIG. 2C, a first zone (corresponding to element 233) is represented by the color red; a second zone (corresponding to element 232) is represented by the color yellow, a third zone (corresponding to element 231) is represented by the color teal, and a fourth zone (corresponding to element 230) is represented by the color purple. FIG. 2C further depicts a fifth zone in the base footwear design (corresponding to element 235), which is represented by the color blue.

Referring back to FIG. 2a, knit structure 223 is positioned adjacent to (or in alignment with) the darker grey color reference on grayscale 205. As such, knit structure 223 and its corresponding design properties (e.g., color, heather, etc.) may be associated with a corresponding zone (e.g., the first zone) of the base footwear design. In some embodiments, an image or rendering of the footwear design may be dynamically updated to reflect user design, such as changes to the knit structure of the footwear design.

FIG. 2D depicts a rendered image of the base footwear design that may be displayed in a portion of user interface 200. The rendered image of the footwear design that includes a mapping of the knit structures displayed in user interface 200 (e.g., knit structures 220-23). In some aspects of the present disclosure, the rendering of the footwear design may be dynamically updated to reflect user design changes, such as changes to knit structures for the footwear design.

Referring now to FIG. 2C, the first zone of the base footwear design depicted by element 233 may be associated with a particular knit structure, and may be rendered into a 3D graphical representation of the article of footwear, as illustrated in FIG. 2D. When a knit structure, such as knit structure 223 is positioned adjacent to a particular color reference on grayscale 205 corresponding to the first zone, the knit structure and its corresponding design properties may be associated with the first zone of the base footwear design, and subsequently rendered in a portion of user interface 200. In this particular example, knit structure 223 would correspond to a knit structure having a first heather pattern, and that includes various colors and shades knit material, such as yellow and green knit materials, as illustrated in FIG. 2D. As depicted by element 233, those portions of the base footwear design corresponding to the first zone in FIG. 2C, are illustrated in FIG. 2D as being associated with the particular knit structure having the first heather pattern and various shades of yellow and green knit materials in accordance with knit structure 223. As discussed above and as discussed in more detail below, the characteristics and/or properties of a knit structure, such as knit structure 223, may be adjusted or modified in a variety of ways by the user. Additionally or alternatively, the user may associate a second knit structure with the first zone of the footwear design. Further, the user interface may visually modify a graphical representation of the design, such as the rendering depicted in FIG. 2D, to reflect any changes and/or modifications made to one or more knit structures.

Referring to the example above, as illustrated in FIG. 2C, element 232 depicts a second zone of the footwear design and is represented by the color yellow on the rendered image of the base footwear design. Referring back to FIG. 2a, knit structure 222 may be positioned adjacent to a particular color reference on grayscale 205 corresponding to the second zone of the footwear design (e.g., element 232). Accordingly, knit structure 222 and its corresponding design properties (e.g., color, heather, etc.) may be associated with the second zone of the footwear design. As an example, referring to FIGS. 2C and 2D, the second zone of the base footwear design may be associated with knit structure 222 in view of the knit structures placement along grayscale 205 and the grayscale mapping of zones for the footwear design, as described above with reference to portion 201 of user interface 200. Knit structure 222 corresponds to a knit structure having a second heather pattern (e.g., horizontal stripes), and that includes various shades or colors of knit materials (e.g., yellow, blue, and green knit materials), as illustrated in FIG. 2D. As depicted by element 232, those portions of the footwear design corresponding to the second zone in FIG. 2C, may be rendered to include the characteristics associated with knit structure 222 (e.g., the second heather pattern and various shades of yellow, blue, and green knit materials).

Referring to the example above, as illustrated in FIG. 2C, element 231 depicts a third zone of the footwear design and is represented by the color teal on the rendered image of the base footwear design. Referring back to FIG. 2a, knit structure 221 may be positioned adjacent to a particular color reference on grayscale 205 corresponding to the third zone of the footwear design (e.g., element 231). Accordingly, knit structure 221 and its corresponding design properties (e.g., color, heather, etc.) may be associated with the third zone of the footwear design. As an example, referring to FIGS. 2C and 2D, the third zone of the base footwear design may be associated with knit structure 221 in view of the knit structures placement along grayscale 205 and the grayscale mapping of zones for the footwear design, as described above with reference to portion 201. Knit structure 221 corresponds to a knit structure having a third heather pattern, and that includes various shades knit materials (e.g., green knit materials), as illustrated in FIG. 2D. As depicted by element 231, those portions of the footwear design corresponding to the second zone in FIG. 2C, may be rendered to include the characteristics associated with knit structure 221 (e.g., the third heather pattern and various shades of green knit materials).

Lastly, as illustrated in FIG. 2C, element 230 depicts a fourth zone of the footwear design is represented by the color purple on the rendered image of the base footwear design. Referring back to FIG. 2a, knit structure 220 may be positioned adjacent to a particular color reference on grayscale 205 corresponding to the fourth zone of the footwear design (e.g., element 230). Accordingly, knit structure 220 and its corresponding design properties (e.g., color, heather, etc.) may be associated with the fourth zone of the footwear design. As an example, referring to FIGS. 2C and 2D, the fourth zone of the base footwear design may be associated with knit structure 220 in view of the knit structures placement along grayscale 205 and the grayscale mapping of zones for the footwear design, as described above with reference to portion 201. Accordingly, knit structure 220 and its corresponding design properties may be associated with the fourth zone of the base footwear design. In this particular example, knit structure 220 would correspond to a knit structure having a fourth heather pattern, and that includes various shades of green and blue knit materials, as illustrated in FIG. 2D. As depicted by element 230, those portions of the base footwear design corresponding to the fourth zone in FIG. 2C, may be rendered to include the characteristics associated with knit structure 220 (e.g., the fourth heather pattern and consists of various shades of green and blue knit materials).

Figure 2E:
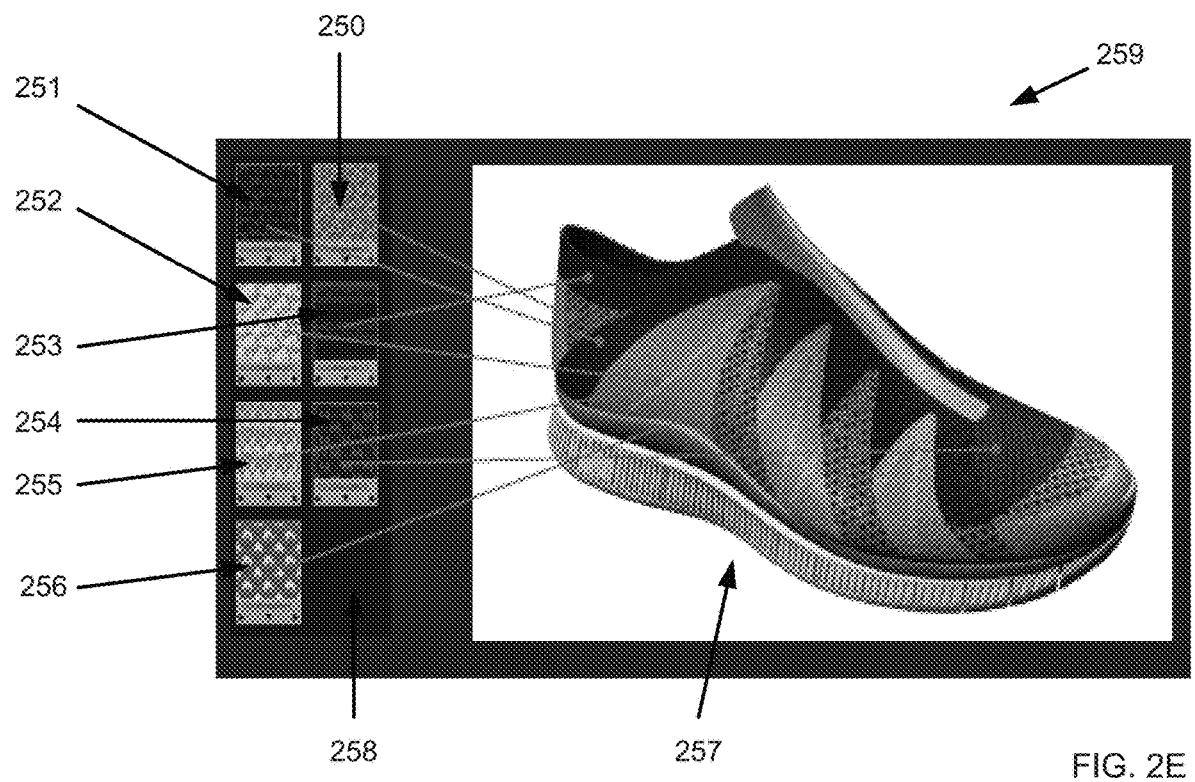

FIG. 2E depicts an example interface screen 259 that shows a 3D graphical representation of the base footwear design in portion 257 of the interface screen. The 3d graphical representation of the base footwear design includes a color and texture mapping of the various zones of the base footwear design based on the design properties (e.g., color, heather, etc.) of a plurality of corresponding knit structures. In this illustrated example, the base footwear design includes at least 7 zones, each represented by a knit structure having different design properties, as illustrated by elements 250-257. A user may interact with interface screen 259 to modify the design properties of the one or more knit structures (corresponding to elements 250-257) that comprise the base footwear design. In some aspects of the present disclosure, the user may modify the design characteristics for one or more zones of the base footwear design by modifying the location of a knit structure in portion 258 of interface screen 259. When a user changes the position of the one or more knit structures in portion 258 of the interface screen, the rendered design properties of the various zones of the base footwear design illustrated in portion 25 of the interface screen may be updated to reflect the change in design properties. As will be appreciated, the position of knit structures need not be in reference to a grayscale, but may be referenced with respect to various other scales or positions within a portion of the interface screen that may indicate (or are associated with) one or more zones (or areas) of the footwear design.

Figure 2F:
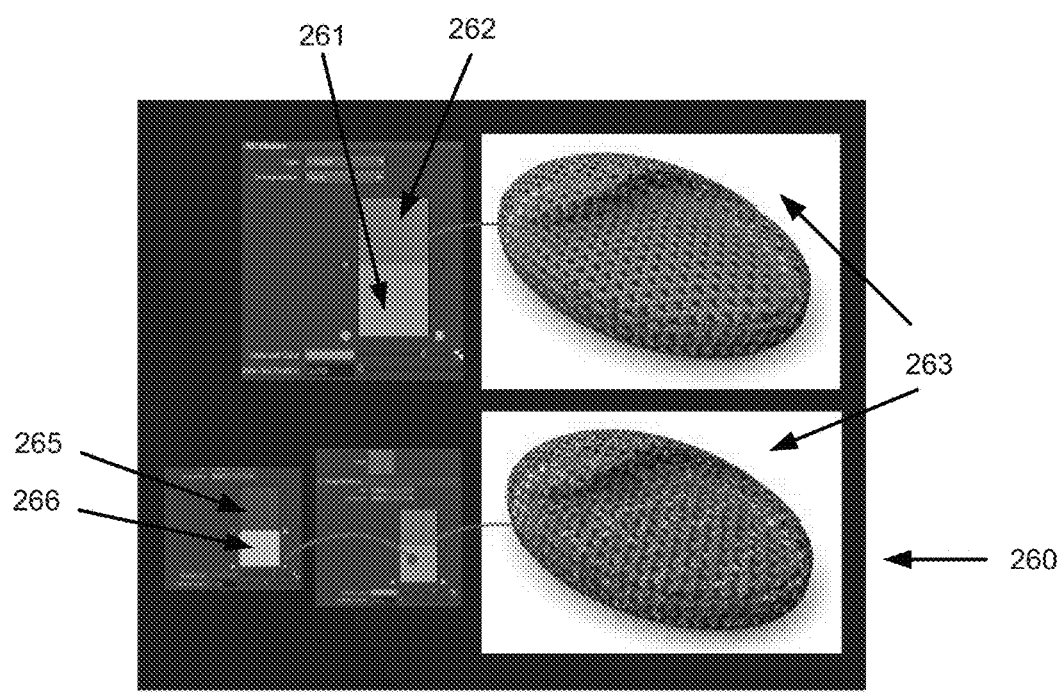
FIG. 2F illustrates a portion of an example interface for designing footwear, in accordance with one or more aspects of the present disclosure.

FIG. 2F depicts a user interface 260 for selecting various color values (e.g., color options) to assign a knit structure. As noted above, one or more color values may be assigned to a particular knit structure that may be associated with a zone of a footwear design. As illustrated in FIG. 2F, a first color (corresponding to element 261) and a second color (corresponding to element 262) have been assigned to a knit structure. The first color and second color may correspond to RGB, CMYK, or other suitable color values, respectively. Display portion 263 of the user interface illustrates a graphical rendering of an image representing the selected knit structure and its corresponding design properties, including color and heather. As a user modifies the first and second color values of the knit structure, display portion 263 of the interface screen may be dynamically updated to reflect that changes (and/or received user input).

In some aspects of the present disclosure, a user interface may provide the user with tools to generate a color option that comprises multiple colors. For example, referring to FIG. 2F, secondary colors 265 and 266 may be combined to generate a new color that can be assigned to the knit structure. Subsequently, display portion 263 of the user interface renders a new image representing the selected knit structure and its corresponding design properties, including the new color values.

Other features and functionality may be provided in the interface, if desired, without departing from the scope of the present disclosure. The following features and functionality may be provided in some manner via the interface: the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product or some other intermediate default design (optionally selected and stored by the user)), and the ability to exit or quit the design session.

Figure 3:
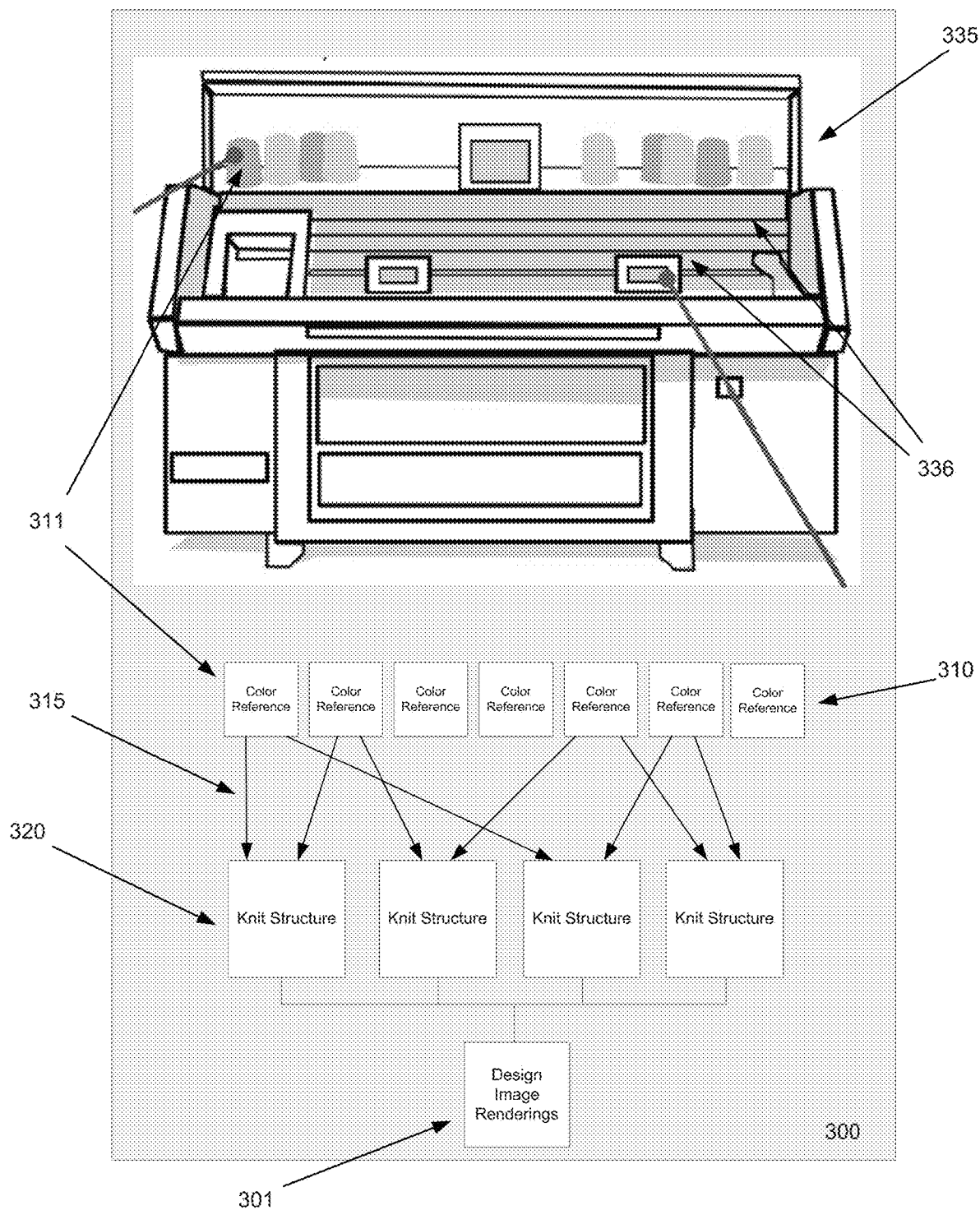
FIG. 3 illustrates an example interface for designing footwear, in accordance with one or more aspects of the present disclosure.

FIG. 3 illustrates an example interface for modifying a footwear image in accordance with one or more aspects of the present disclosure. As noted above, user design choices may be constrained based on a number of factors, including structural rules, cost to manufacture, time to manufacture, and the availability or supply of materials.

User interface 300 includes a knitting machine image 335, a palette of color references 310, one or more color vectors (e.g., vector 315), portions of the interface representing knit structures (e.g., knit structure 320), and a display portion 301 illustrating renderings of the footwear design. User interface 300 may display animations illustrating the various design choices and selections made by a user during the design process. As will be appreciated, the components of user interface 300 may include the same or similar features and functions of corresponding components in interface 200. For example, color reference palette 310 may include the same or similar features and/or functions as color palette 210. For instance, while not show in FIG. 3, color reference 311 may include a drop down menu to provide a list of available color values. By selecting or hovering a pointer (e.g., mouse pointer) over an interface component, such as color reference 311 or knit structure 320, user interface 300 may display additional information associated with that component.

As another example, knit structure 320 may include may include the same or similar features and/or functions as knit structure 220. For instance, while not show in FIG. 3, knit structure 320 may include a display of a texture image (e.g., material swatch) associated with the knit structure, or may include an icon permitting the user to modify the heather associated with the knit structure. Similar to user interface 200, a user may draw a color vector 315 in user interface 300 to associate (or assign) a color value to a particular knit structure. After the color vector has been drawn or modified, user interface 300 may graphically illustrate a material, (such as yarn from the one or more spools associated with the selected color value) being arranged in one or more portions of knitting machine image 335, as illustrated by element 336.

As yet another example, the display portion 301 may include the same or similar features and functions of display portion 201 and display portion 202. Display portion 301 may depict a graphical representation (or rendering) of the footwear upper in accordance with the user's footwear design.

Knitting machine image 335 in user interface 300 may serve as a graphic representation of a knitting machine (e.g., knitting machine 135) used to manufacture footwear uppers (e.g., upper 140). Material, such as material 130, used by knitting machine 135 to manufacture footwear upper 140 may be graphically represented in knitting machine image 335. For example, as illustrated by element 310, each color or color reference selected by a user may be graphically represented by one or more spools of yarn (or some other material) in knitting machine image 335.

As the user selects and/or modifies various design choices, these choices may be reflected (e.g., graphically represented or simulated) in knitting machine image 335. For example, changes made to the color value of color reference 310 may be reflected in knitting machine image 335 by changing the color of one or more spools of yarn to correspond to the new color value. As another example, the number of colors that may be used for a particular footwear design may be graphically represented by the number of spools in knitting machine image 335. In this example, an empty spool may represent an undefined or available color reference that may be added to the color palette.

As will be appreciated, the user's design choices may be limited based on limitations associated with the footwear design, such as availability of materials, structural rules, and physical limitations of a knitting machine. For example, due to limitations in the supply of certain materials used to manufacture a footwear upper, a user may be provided with a limited number of color choices that correspond to the availability or supply of those materials (e.g., yarn). Thus, when user selects color reference 311, the user may be provided with a listing of color options that correspond to the materials that are currently in supply. As another example, due to the structural or physical limitations of a knitting machine, a user may be limited in the number of color options that may be assigned to a particular knit structure. For instance, if a knitting machine, such as knitting machine 135, has a predetermined number of "feeders," a user may be limited to the number of color combinations or the number of colors that may be assigned to knit structures based on the number of feeders in the knit machine.

Figure 4:
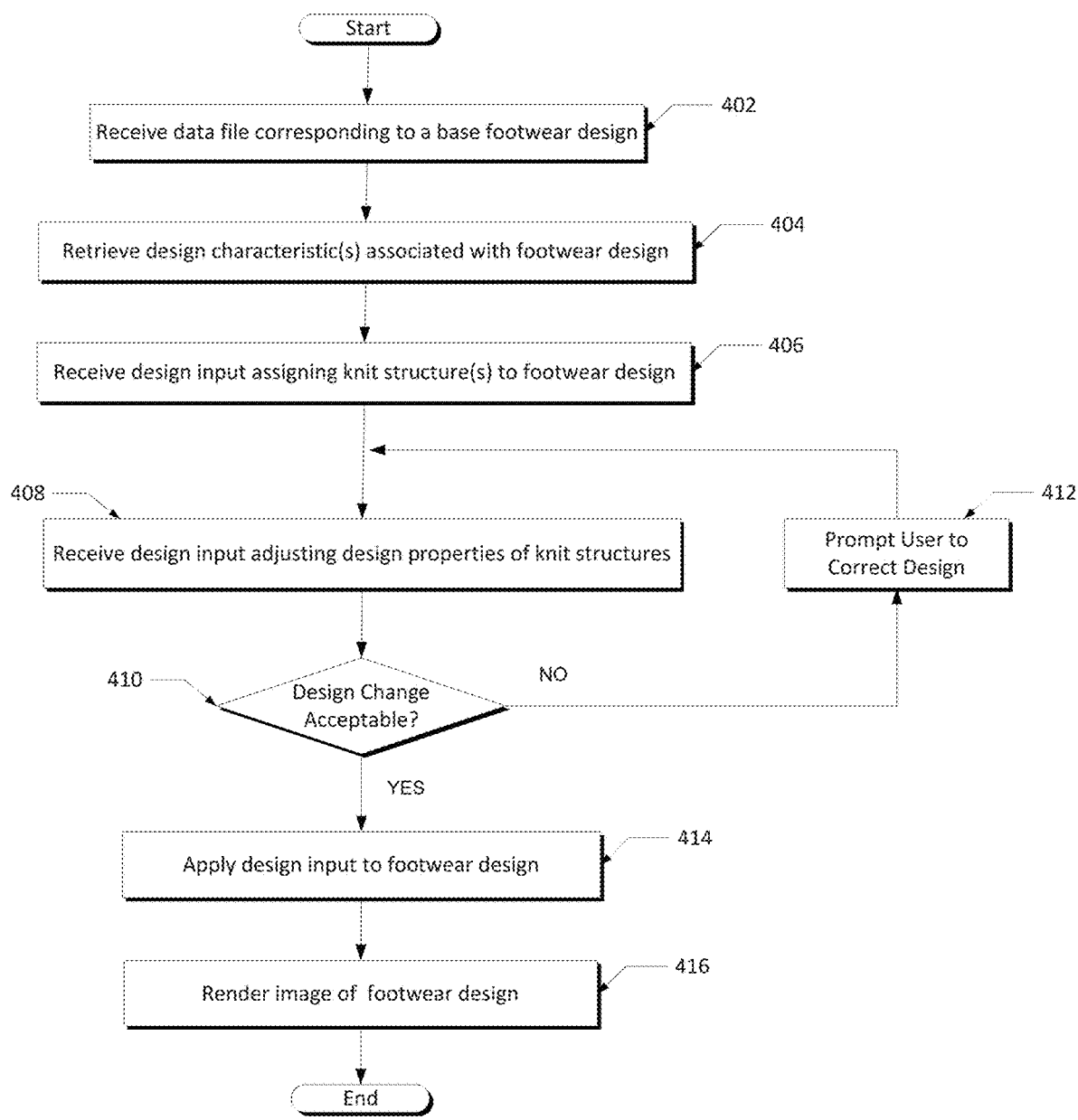
FIG. 4 illustrates a method for designing footwear, in accordance with one or more aspects of the present disclosure.

FIG. 4 illustrates a method of designing footwear, in accordance with one or more aspects of the present disclosure. The steps identified in FIG. 4 may be performed with a system such as the system shown in FIG. 1. First, in step 402 a data file corresponding to a base footwear design may be received by the system. The data file may identify various visual and physical attributes (e.g., features) associated with the base footwear design. In some embodiments, a user may select a base footwear design from a plurality of base footwear designs stored by the system. Next, in step 404, the system may retrieve one or more design characteristics associated with the footwear design received during step 402. The design characteristics for the footwear design may be retrieved from a variety of sources, such as grading library 113, lasts library 112, color library 111, etc. In some embodiments, the base footwear design may be edited or modified by a user. The system may store in memory the edited footwear design.

Next, in step 406 the system may receive design input assigning one or more knit structures to a footwear design. A user may identify, via a user interface (e.g., UI 115), one or more knit structures to be associated with (e.g., mapped to) particular zones (or areas) of the footwear design. The knit structures include design properties that represent the various materials (e.g., yarn construction) that provide texture and other visually perceptible attributes associated with the footwear design.

Next, in step 408 the system may receive design input adjusting one or more design properties for the one or more knit structures assigned to the footwear design during step 406. In some embodiments, during step 408, color values and heather patterns may be retrieved from a color library and heather library, respectively. The color values and heathers may be assigned to the one or more knit structures assigned to the footwear design during step 406. In step 410, the system may determine whether the design input received during step 408 is acceptable. During step 410, the system may extract various data associated with the footwear design and compare this data to information collected and/or stored by the system (e.g., structural evaluation module 105, bill of materials module 106, cost estimation module 107, time estimation module 108, etc.). For example, the system may determine whether the various knit materials selected for the footwear design are currently available in inventory. In this example, the system may compare the data indicating the knit structure and materials selected for the footwear design with data stored in bill of materials module 106 to make the determination. As another example, the system may determine whether the design changes and associated knit structures selected for the footwear design conform with the structural rules (and/or characteristics) assigned to the footwear design. In this example, the system may compare the data indicating the knit structure for the footwear design with data stored in structural evaluation module 105 to make the determination. As yet another example, the system may determine whether a design change (e.g., a change in size of the footwear) for the footwear design conforms with grading rules (and/or characteristics) assigned to the footwear design. In this example, the system may compare the data indicating a modification to the footwear design (and/or a knit structure therein) with data stored in grading module 104 to make such a determination.

In some aspects of the present disclosure, during step 410, the system may use a similarity metric when comparing the footwear design data to data stored by the system (e.g., structural evaluation module 105, bill of materials module 106, cost estimation module 107, time estimation module 108, etc.). If the footwear design data does not sufficiently meet the requirements and/or characteristics associated with the data stored by the system, the system may determine that the design change may not be accepted (e.g., the article of footwear cannot be manufactured based on the current footwear design).

If the system determines that the design change analyzed during step 410 is not acceptable, the method may proceed to step 412, where the system may prompt the user to correct or modify the unacceptable design change. In some embodiments, the system may identify the particular design change that is unacceptable and provide the user additional information regarding the design change. In other embodiments, data stored by the system (e.g., data stored in structural evaluation module 105, bill of materials module 106, cost estimation module 107, time estimation module 108, etc.) may be further processed by the system to recommend and/or suggest one or more design changes to the footwear design, such that the footwear design may be subsequently accepted by the system. Next the method returns to step 408, where the system may receive design input adjusting one or more design properties for the one or more knit structures assigned to the footwear design.

If the system determines that the design change analyzed during step 410 is acceptable, the method may proceed to step 414, where the system may apply the design input received during step 408 to the footwear design.

Finally, in step 416 the system may render an image of the footwear design. The rendered image may include simulated knit texture and colors in accordance with the various design characteristics and properties of the footwear design. In some embodiments, step 416 may be performed by an image editing application and the process may be controlled by a script. In other embodiments, steps 414 and 416 may be combined or performed simultaneously. The image rendering step may utilize a variety of existing and conventional image processing tools.

While the present disclosure have been described with respect to specific examples including presently preferred modes of carrying out aspects of the present disclosure, those skilled in the art will appreciate that numerous variations and permutations of the above described systems and techniques may be made without departing from the present disclosure. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from the present disclosure. Various changes and modifications to the systems, methods, and user interfaces may be made without departing from the spirit and scope of the present disclosure, as set forth in the appended claims.

What is claimed is:

1. An apparatus comprising:
one or more processors; and
memory storing instructions that, when executed by the one or more processors, cause the apparatus to:
receive input data indicating selection of a knit footwear upper design;
generate, via a first interface, an appearance of the selected knit footwear upper design;
receive design input for a plurality of knit structures associated with the selected knit footwear upper design;
for each knit structure in the plurality of knit structures:
determine a zone of the selected knit footwear upper design associated with the knit structure; and
apply a plurality of design characteristics associated with the knit structure to a corresponding zone of the selected knit footwear upper design;
visually update, based on the applied design characteristics, the appearance of the selected knit footwear upper design; and
send, to one or more other computing devices controlling one or more knitting machines to manufacture a knit footwear upper, knitting instructions created based on the selected knit footwear upper design and the applied design characteristics.

2. The apparatus of claim 1, wherein the instructions, when executed by the one or more processors, further cause the apparatus to:
modify, based on a location of the plurality of knit structures in the first interface, the appearance of the selected knit footwear upper design.

3. The apparatus of claim 1, wherein the instructions, when executed, further cause the apparatus to:
determine, based on a type of footwear associated with the selected knit footwear upper design, one or more physical integrity characteristics for the selected knit footwear upper design.

4. The apparatus of claim 3, wherein the instructions, when executed, further cause the apparatus to:
recommend, based on determining that the received design input does not satisfy the one or more physical integrity characteristics associated with the selected knit footwear upper design, one or more design modifications to have the selected knit footwear upper design conform with the one or more physical integrity characteristics.

5. The apparatus of claim 4, wherein the instructions, when executed, further cause the apparatus to:
generate, based on the one or more design modifications associated with the selected knit footwear upper design, the knitting instructions.

6. A method of producing a knit footwear upper comprising:
receiving, by a computing device, input data indicating selection of a knit footwear upper design;
generating, via a first interface, an appearance of the selected knit footwear upper design;
receiving design input for a plurality of knit structures associated with the selected knit footwear upper design;
for each knit structure in the plurality of knit structures:
determine a zone of the selected knit footwear upper design associated with the knit structure; and
apply a plurality of design characteristics associated with the knit structure to a corresponding zone of the selected knit footwear upper design;
visually updating, based on the applied design characteristics, the appearance of the selected knit footwear upper design; and
sending, to one or more other computing devices controlling one or more knitting machines to manufacture a knit footwear upper, knitting instructions created based on the selected knit footwear upper design and the applied design characteristics.

7. The method of claim 6, further comprising:
modifying, based on a location of the plurality of knit structures in the first interface, the appearance of the selected knit footwear upper design.

8. The method of claim 6, further comprising:
determining, based on a type of footwear associated with the selected knit footwear upper design, one or more physical integrity characteristics for the selected knit footwear upper design.

9. The method of claim 8, further comprising:
recommending, based on determining that the received design input does not satisfy the one or more physical integrity characteristics associated with the selected knit footwear upper design, one or more design modifications to have the selected knit footwear upper design conform with the one or more physical integrity characteristics.

10. The method of claim 9, further comprising:
generating, based on the one or more design modifications associated with the selected knit footwear upper design, the knitting instructions.

11. A non-transitory machine readable medium storing instructions that, when executed, cause a computing device to:
receive input data indicating selection of a knit footwear upper design;
generate, via a first interface, an appearance of the selected knit footwear upper design;
receive design input for a plurality of knit structures associated with the selected knit footwear upper design;
for each knit structure in the plurality of knit structures:
determine a zone of the selected knit footwear upper design associated with the knit structure; and
apply a plurality of design characteristics associated with the knit structure to a corresponding zone of the selected knit footwear upper design;
visually update, based on the applied design characteristics, the appearance of the selected knit footwear upper design; and
send, to one or more other computing devices controlling one or more knitting machines to manufacture a knit footwear upper, knitting instructions created based on the selected knit footwear upper design and the applied design characteristics.

12. The non-transitory machine readable medium of claim 11, wherein the instructions, when executed, further cause the computing device to:
modify, based on a location of the plurality of knit structures in the first interface, the appearance of the selected knit footwear upper design.

13. The non-transitory machine readable medium of claim 11, wherein the instructions, when executed, further cause the computing device to:
determine, based on a type of footwear associated with the selected knit footwear upper design, one or more physical integrity characteristics for the selected knit footwear upper design.

14. The non-transitory machine readable medium of claim 13, wherein the instructions, when executed, further cause the computing device to:
recommend, based on determining that the received design input does not satisfy the one or more physical integrity characteristics associated with the selected knit footwear upper design, one or more design modifications to have the selected knit footwear upper design conform with the one or more physical integrity characteristics.

15. The non-transitory machine readable medium of claim 14, wherein the instructions, when executed, further cause the computing device to:
generate, based on the one or more design modifications associated with the selected knit footwear upper design, the knitting instructions.

16. A system for designing and producing a knit footwear upper, the system comprising:
a user interface on a user interface display that generates and visually updates an appearance of a knit footwear upper design;
one or more input devices that provide design input for a plurality of knit structures associated with the knit footwear upper design;
one or more programmable knitting machines that receive knitting instructions, and knit a footwear upper in accordance with the received knitting instructions; and
a computing device comprising:
one or more processors; and
memory storing instructions that, when executed by the one or more processors, cause the computing device to:
for each knit structure in the plurality of knit structures:
determine a zone of the knit footwear upper design associated with the knit structure; and
apply a plurality of design characteristics associated with the knit structure to a corresponding zone of the knit footwear upper design;
visually update, based on the applied design characteristics, the appearance of the selected knit footwear upper design; and
send, to one or more other computing devices controlling one or more knitting machines to manufacture a knit footwear upper, knitting instructions created based on the knit footwear upper design and the applied design characteristics.

17. The system of claim 16, wherein the instructions, when executed, further cause the computing device to visually update the appearance of the knit footwear upper design based on a location of the plurality of knit structures in the user interface.

18. The system of claim 16, further comprising a structural rules component that provides data relating to one or more physical integrity characteristics associated with the footwear upper to be manufactured, and
wherein the instructions, when executed, further cause the computing device to:
determine, based on a type of footwear associated with the knit footwear upper design, one or more physical integrity characteristics for the knit footwear upper design.

19. The system of claim 16, wherein the instructions, when executed, further cause the computing device to:
recommend, based on determining that received design input does not satisfy one or more physical integrity characteristics associated with the knit footwear upper design, one or more design modifications to have the knit footwear upper design conform with the one or more physical integrity characteristics.

20. The system of claim 16, wherein a portion of the user interface comprises a graphical representation of a knitting machine.

* * * * *